S. M. UDALE.
THERMOSTAT.
APPLICATION FILED OCT. 15, 1920.
1,371,277.
Patented Mar. 15, 1921.
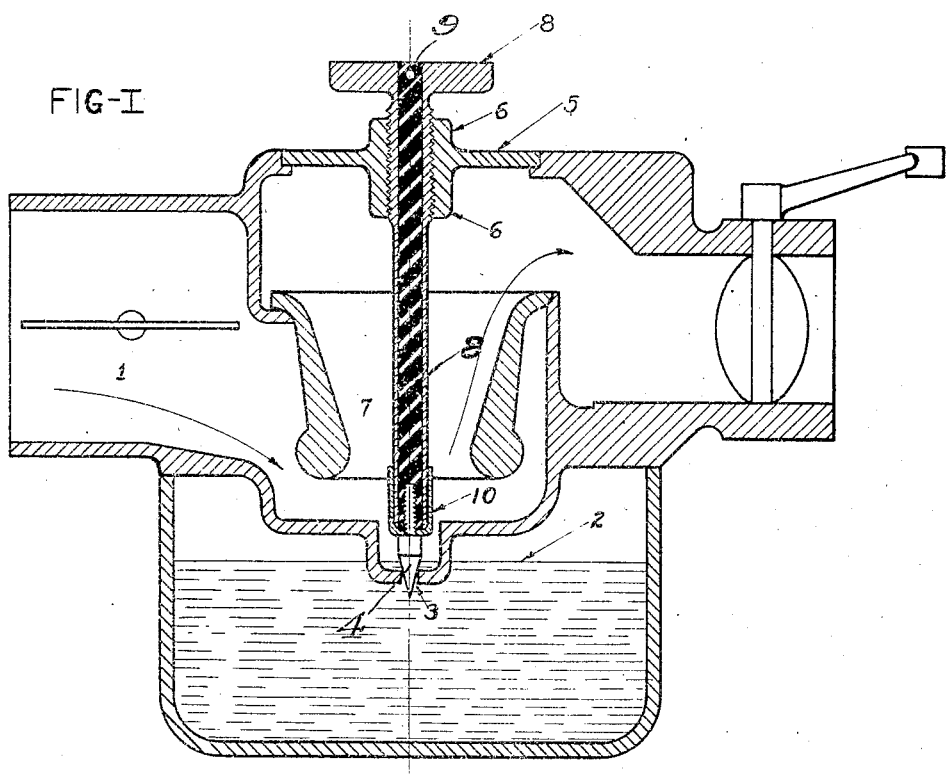
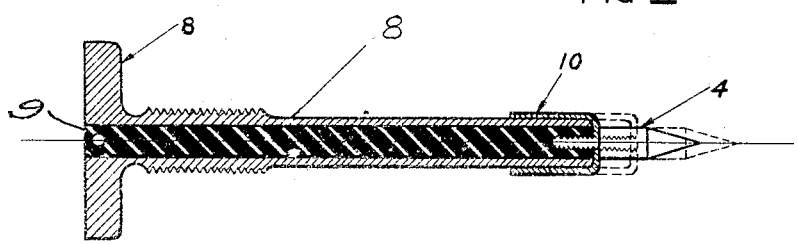

UNITED STATES PATENT OFFICE.

STANLEY M. UDALE, OF DETROIT, MICHIGAN, ASSIGNOR TO GEORGE M. HOLLEY, OF DETROIT, MICHIGAN.

THERMOSTAT.

1,371,277.  Specification of Letters Patent.  Patented Mar. 15, 1921.

Original application filed December 29, 1919, Serial No. 348,128. Divided and this application filed October 15, 1920. Serial No. 417,274.

*To all whom it may concern:*

Be it known that I, STANLEY M. UDALE, citizen of the United States, residing at Detroit, in the county of Wayne and State of Michigan, have invented certain new and useful Improvements in Thermostats, (divided application of U. S. Serial No. 348,128,) of which the following is a specification.

This invention relates to thermostatic means for controlling the flow of fuel from an orifice specifically adapted to supply an internal combustion engine so that the fuel supply may be regulated so as to respond to the temperature changes within the mixing chamber where the fuel and air are mixed.

This thermostat is also adapted for controlling the flow of fluids generally.

Figure 1 shows the general arrangement of a conventional carbureter to which the novel thermostat is applied.

Fig. 2 shows a detail construction of the thermostat.

In Fig. 1 (1) is the air entrance to a carbureter supplied with fuel from a reservoir (2) through a fuel orifice (3) controlled by a needle point (4), which needle is supported by the carbureter cover (5) and by the interiorly threaded projection (6). The fuel sprays into the mixing chamber (7), with which the needle valve (4) is concentric.

In Fig. 2 the needle itself is shown, and consists of a piece (8) with a drilled hole through, into which fits a rod (9) of hard rubber. This rubber carries the needle point (4) and is protected from the gasolene by the cap (10).

The operation of the thermostat is as follows:

The needle responds to the temperature changes due to the large co-efficiency of the expansion of the rubber relative to the metal piece (8).

For the reason that hot air is arranged to enter the carbureter at (1) the needle responds to the mixture temperature rather than to the temperature of the liquid fuel. The hot air is obtained from the exhaust pipe, the temperature of which increases more rapidly than that of the liquid, hence an added quantity of fuel is supplied during the period when the engine is warming up, which is the period during which an increased supply of fuel is required.

This device therefore automatically responds to temperature changes of the air supply. To a less degree it responds to the temperature of the liquid fuel sprayed out of the orifice (3).

Obviously this thermostat may be applied to similar devices where fluids have to be controlled with relation to temperature.

What I claim is:

1. In a thermostat, an adjustable rod, a drilled passage within said adjustable rod, a rod of hard rubber within said passage anchored at one end of said rod and a needle point attached to the hard rubber at the other end.

2. In a thermostat, an adjustable rod, a drilled passage within said adjustable rod, a rod of hard rubber within said passage anchored at one end to said rod and a needle point attached to the hard rubber at the other end and a cap protecting the end of rubber rod.

In testimony whereof I affix my signature.

STANLEY M. UDALE.